United States Patent [19]

Baciak

[11] Patent Number: 4,987,293

[45] Date of Patent: Jan. 22, 1991

[54] DIGITAL POSITION MONITOR

[75] Inventor: Mark G. Baciak, West Melbourne, Fla.

[73] Assignee: The United States of America as represented by the Secretary of the Air Force, Washington, D.C.

[21] Appl. No.: 493,257

[22] Filed: Mar. 14, 1990

[51] Int. Cl.$^5$ .............................................. H01J 40/14
[52] U.S. Cl. .................................. 250/206.1; 356/141
[58] Field of Search ............... 250/206.1, 206.2, 203.1, 250/203.2; 356/141, 152

[56] References Cited

U.S. PATENT DOCUMENTS

| | | | |
|---|---|---|---|
| 3,670,168 | 6/1972 | Low et al. | 250/225 |
| 3,825,845 | 7/1974 | Angelback et al. | 330/4.3 |
| 4,639,586 | 1/1987 | Fender et al. | 250/201 |
| 4,667,090 | 5/1987 | Carreras et al. | 250/201 |
| 4,689,758 | 8/1987 | Carreras | 364/561 |
| 4,711,998 | 12/1987 | Makek | 250/206.1 |
| 4,749,849 | 6/1988 | Hoeberechts et al. | 250/206.1 |

*Primary Examiner*—Davis L. Willis
*Assistant Examiner*—K. Shami
*Attorney, Agent, or Firm*—Jacob N. Erlich; Donald J. Singer

[57] ABSTRACT

A digital position monitor is disclosed which is used to output an X and Y position of a laser beam on a quadrant or lateral effect detector. The device includes two high speed microprocessors to perform either a quad cell or lateral effect algorithm in the open loop mode. In the closed loop operation, in addition to the algorithm, a digital filter is also executed. The decision to open or close the tilt loops is made by a central processor or by an external input to the central processor. Each microprocessor is designed to perform either the X or Y function. In brief, the operation is as follows: a detector senses the position error and provides a signal to analog circuits. The output from the analog circuits is applied in parallel to the circuits of the X and Y channels. Both channels comprise an analog-to-digital converter, a microprocessor and a digital-to-analog converter connected in series. Each channel provides an X or Y output. The microprocessor each channel is under the control of a central processor.

6 Claims, 3 Drawing Sheets

DIGITAL POSITION MONITOR

STATEMENT OF GOVERNMENT INTEREST

The invention described herein may be manufactured and used by or for Government for governmental purposes without the payment of any royalty thereon.

BACKGROUND OF THE INVENTION

The present invention relates generally to optical laser telescopes, and more specifically to a digital position monitor which is used to output an X and Y position of a laser beam on a quadrant or lateral effect detector.

The subject matter of this application is related to the subject matter contained in the following U.S. patent application Ser. No. 0/7,500,614, filed 13 Mar. 1990, entitled "Pointer/Tracker for a Phased Array Laser System" by Mark Baciak, the disclosure of which is specifically incorporated herein by reference.

In the prior art, the use of multiple telescopes in a synthetic array has encountered a number of problems. Dynamic off axis pointing of arrays of multiple telescopes is difficult to align and maintain since such individual telescope must have its phase dynamically adjusted to point its laser output in a steerable direction that coincides with the rest of the telescopes in the array. One prerequisite of this phase adjustment is that the actual direction of all the telescopes must be measured and compared before the adjustment requirements are determined.

The task of measuring the directional outputs of individual laser telescopes is alleviated, to some extent, by the systems disclosed in the following U.S. Patents, the disclosures of which are incorporated herein by reference:

U.S. Pat. No. 4,639,586 issued to Fender et al;
U.S. Pat. No. 4,667,090 issued to Carreras et al;
U.S. Pat. No. 4,689,758 issued to Carreras;
U.S. Pat. No. 3,670,168 issued to Low; and
U.S. Pat. No. 3,825,845 issued to Angelback.

The above-cited references are examples of prior art. The Fender apparatus performs phase matching between pairs of laser beams using an array containing at least two optical telescopes which become useable as a laser transmitter when combined with an optical phase matching system consisting of: a collecting telescope, a detector array, two fold mirrors, analog-to-digital converter, microprocessor, and two sets of correcting mirrors.

The Carreras reference provides a detailed apparatus and technique to calculate the optical phase difference for two signals from an interference pattern provided by the CCD camera. The Carreras system has been successfully used with the Fender et al system to determine the difference between two beams using one of a number of phase estimating algorithms.

Once an accurate estimate of the phase difference is determined, the estimated error is used to adjust the phase by the correcting mirrors which adjust the optical path lengths of the two outgoing beams. This approach is also used in the system of the Carreras et al reference. While the Carreras et al system provides improved tilt control, it offers limited flexibility, particularly when all telescopes are forced to dynamically track a reference. This is because the original tracker designed for the phased array system implemented a concept of the common physical element. The theory was that low frequency drifts in electronics, optics, and mechanical components caused distortion of the point spread function in the far field pattern. It was felt that if the optics and electronics were common to all three telescopes that the long term distortion effects could be controlled. That was true to a point, but the tracker offered limited capability. Off axis pointing presented a new problem that was beyond the capability of the tracker. Additionally, the tracker required complicated electronic circuitry that was difficult to align and maintain. It also caused ambiguities and instabilities in the tilt control loops.

Another system which may be used for rapid optical phasing of optical devices using white light interferometry is disclosed in the patent application of Mark Baciak entitled "Method and Apparatus for Rapid Optical Phasing", U.S. patent application Ser. No. 857,621, the disclosure of which is incorporated herein by reference. The system of the Baciak '621' reference includes a white light source, a beam splitter, a scanning mirror and a stationary reflective surface. The scanning mirror is moved in piston while reflected light is observed by an electro-optic sensor at a receiver. A nulled pattern has been previously established at the receiver. An electrical signal from the electro-optic sensor is mounted at an amplification and recording means to identify variations in reflected light intensity that are caused by white light fringes. White light fringes only occur at zero optical difference, i.e. when the scanning mirror and stationary reflective surface are in phase.

The Baciak '621' reference is important because it discloses a method of phasing a plurality of optical devices. The method comprises transmitting light through a beam splitter to a reference mirror and an optical device to be phased. Light reflected from the reference mirror and the optical device are recombined at the beam splitter and directed to a receiver. Light at the receiver is converted by an electro-optical sensor to an electrical signal which is transmitted to a detection and amplification means. The optical device is then moved along the path of light directed to it (i.e., in piston) from the beam splitter until a variation in light intensity at the receiver indicates that there is zero optical difference between the reference mirror and the optical device being tested. The first optical device tested can then be considered a reference and this process repeated with other optical devices to be phased.

Another exemplary phase matching system is disclosed in U.S. Pat. No. 4,600,308 by T. Waite entitled "Phase-Matching Arrayed Telescopes with a Corner-Cube-Bridge Metering Rod" the disclosure of which is incorporated herein by reference. The Waite system resembles that of Janet Fender in that is uses an optical trombone to optically adjust the phase of adjacent telescopes through changes in optical path lengths.

All of the references cited above demonstrate the interest in a relatively emerging technology of phased arrays of optical telescopes. The current trend of developments resemble a similar development in phased array radar systems experienced a decade ago. The present invention is believed to contribute to the current developments by providing a digital position monitor which outputs a signal which represents the position of a laser beam, and the direction in which it is pointed. As mentioned above, such dynamic digital measurements are a prerequisite to making phase adjustments to steer a synthetic array of multiple telescopes.

SUMMARY OF THE INVENTION

The present invention includes a digital position monitor which is used to output an X and Y position of a laser beam on a quadrant or lateral effect detector. The device includes two high speed microprocessors to perform either a quad cell or lateral effect algorithm in the open loop mode. In the closed loop operation, in addition to the algorithm, a digital filter is also executed. The decision to open or close the tilt loops is made by a central processor or by an external input to either the X or Y function. In brief, the operation is as follows: a detector senses the position error and provides a signal to analog circuits. The output from the analog circuits is applied in parallel to the circuits of the X and Y channels. Both channels comprise an analog-to-digital converter, a microprocessor and a digital-to-analog converter connected in series. Each channel provides an X or Y output. The microprocessor of each channel is under the control of a central processor.

It is an object of the invention to determine the position of the laser beam which is output by a laser telescope.

It is another object of the invention to constantly monitor the position of the laser beam produced by a laser telescope so that the movement of the beam can be controlled in real time.

These objects together with other objects, features and advantages of the invention will become more readily apparent from the following detailed description when taken in conjunction with the accompanying drawing where like elements are given like reference numerals throughout.

DETAILED DESCRIPTION OF THE PREFERRED EMBODIMENT

The present invention is a digital position monitor, which is used to output an X and Y position of a laser beam quadrant or lateral effect detector. This instrument was developed to replace the limited function analog equivalent. Simply put, this device translates the position of the laser beam detector to an X and Y coordinate system for the purpose of controlling or monitoring the beam movement.

Figure 1:
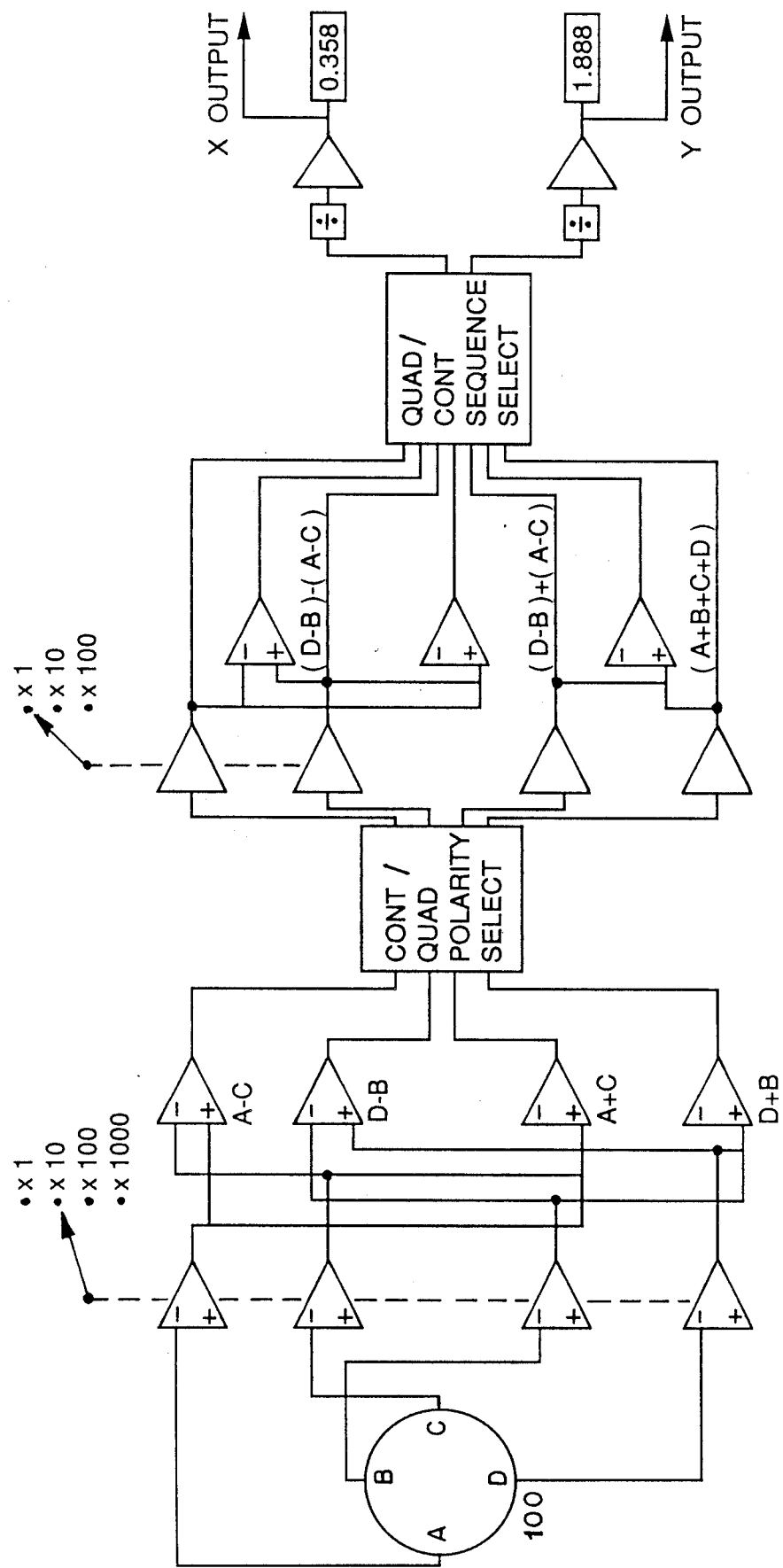
FIG. 1 is a block diagram of a prior art position monitor.

The reader's attention is now directed towards FIG. 1, which is a simplified electrical schematic of the commercially-available UDT Model 431 X-Y position indicator. This is an exemplary prior art system which is used for remote optical sensings of position and angle. When used with the commercially-available UDT lateral effect photodiode or quandrant detector 100, the UDT system senses the position of a light spot on the detector surface.

The operation of the system of FIG. 1 begins as the photodiodes of the lateral effect photodiode element 100 receive an incident optical beam. Each of the photodiodes (A, B, C and D) will photoptically convert the optical signals into electrical currents which are received and processed by a network of analog amplifiers to perform the summing and differcing of the various detector signals as depicted in FIG. 1 as: A−C; D−B; A+C; and D+B.

In FIG. 1, the signals output by the analog amplifiers are then processed by a divider network, which is used to divide the difference signals by the sum signals. This is performed in view of the following detector principles (which were expressed in the 1 Feb. 1989 edition of "Computer Design" in an article entitled "UDT 431 X-Y Optical Position Indicator" and which is incorporated herein by reference.

It is important to note that quadrant photodetectors have two or four separate photodiode elements separated by a small gap. These elements are generally masked onto a common substrate so that their cathode is shared while the anode, or active area of each element is individually contacted. As a light spot is translated across the detector its energy is distributed between adjacent elements and the difference in electrical contribution to each element defines its relative position with respect to the center of the device.

Lateral effect photodiodes, consist of only a single active element. Position is derived by dividing photon-generated electrons within the substrate of the device, rather than profiling the intensity distribution on the surface. This is achieved by applying multiple ohmic contacts on the back layer of the device. Two back contacts are made at opposite ends of the sensor for single axis versions, while dual axis units utilize four contacts.

In either case, light spot position is measured by calculating the differential in photocurrent contribution to each element or each ohmic contact. This can be expressed for a lateral effect detector as:

$$X \text{ Position} = \frac{A - C}{A + C}$$

$$Y \text{ Position} = \frac{B - D}{B + D}$$

and for a quadrant detector as:

$$X \text{ Position} = \frac{(A + D) - (B + C)}{A + B + C + D}$$

$$Y \text{ Position} = \frac{(A + B) - (D + C)}{A + B + C + D}$$

In the system of FIG. 1, a divider network is included to divide the difference signals by the sum signals, and a final buffer amplifier drives the digital display and analog position outputs (0 to ±2VDC).

The gain of the front end amplifiers may be adjusted over approximately 4 decades to optimize the signal-to-noise ratio as a function of the incident light level. The gain of the summing and differencing stage is adjusted to govern the sensitivity of the detector to light spot movement. A quandrant/continuous select switch located on the front panel selects the appropriate amplifier function for the detector in use.

The system of FIG. 1 uses a UDT Model 431 unit to provide an analog X and Y position output signal. This output is proportional to the location of a laser beam striking the surface of the detector 100. This X and Y position signal can be used by phased array laser systems (such as that of the Fender reference) to develop a correction signal that adjusts adjacent laser outputs.

While such analog systems represent a definite advance in the art, a need remains in the art for a digital position monitor which would allow more flexibility and take advantage of the control that such a digital system would provide to users. The present invention is intended to satisfy that need.

Figure 2:
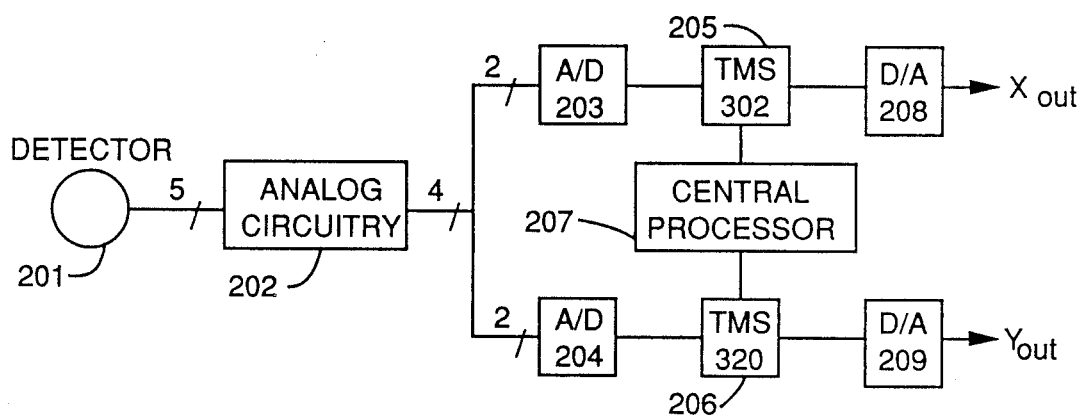
FIG. 2 is a block diagram of the digital position monitor of the present invention.

The reader's attention is now directed towards FIG. 2, which is a block diagram of the digital position monitor of the present invention. The system of FIG. 2 outputs a digital representation of the position of the laser beam of a telescope using: a detector 201, an analog amplifier (transimpedance) circuit 202, two analog-to-digital converters 203 and 204, two microprocessors 205 and 206, a central processor 207, and two digital-to-analog (D/A) converters 208 and 209.

Figure 3:
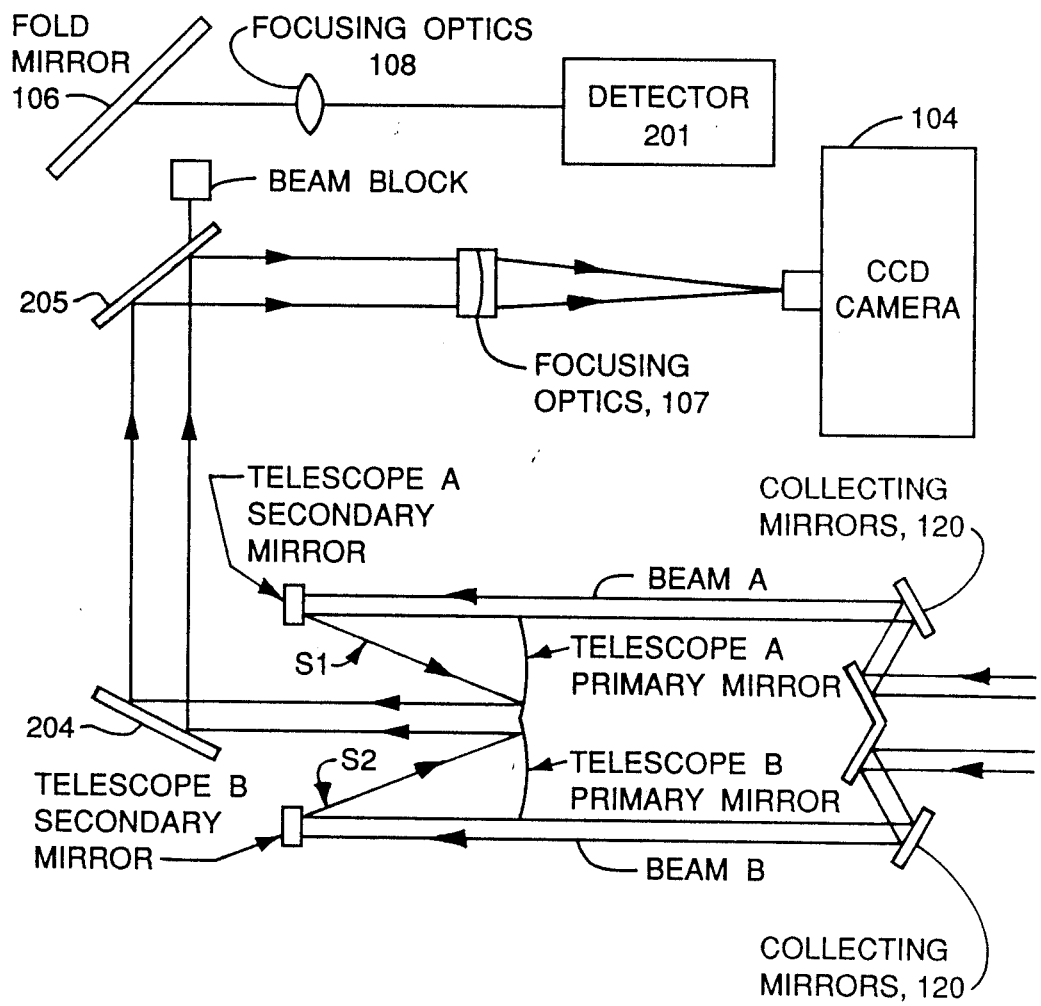
FIG. 3 is a block diagram of the optical sampling system in the present invention.

The detector 201 receives a sample of the output of a laser beam produced by a laser telescope. An example of an optical system which conveys such a sample to the detector is depicted in FIG. 3. The detector of FIG. 2 is a commercially available lateral effect detector (such as the one produced by United Detector Technology), which serves as an electro optic sensor which provides an analog electrical signal proportional to the X and Y position of the laser beam produced by the telescope.

The UDT 431 described above converts the optical output of the laser telescope into an electrical X-Y analog position indicator signal which indicates the tilt of the laser beam with respect to an XY plane which is parallel with the output wavefront of the telescope. An alternative to the quad cell detector is the lateral effect detector, which may also be used as the detector 201 of FIG. 2. An example of a commercially-available system which is suitable for use with the invention is the SPOT model 10-D lateral effect detector. However, the selection of either the quad cell detector versus the lateral effect detector will have a direct impact on the signal processing algorithm used by the TMS 320 microprocessors. As discussed below, if the detector is a quad cell detector, a special quad cell algorithm must be used. If the detector is a lateral effect detector, the microprocessors should process the data with the lateral effect algorithm described below.

As mentioned above, the detector 201 produces an electrical signal which is proportional to the location of a laser beam striking the surface of the quad cell or lateral effect detector. The analog circuit 202 is a transimpedance amplifier circuit that receives currents from the detector and converts them to voltages, and outputs the signals to produce four output signals.

The four output signals of the analog circuit 202 are each received and converted into a digital signal by the A/D converters 203 and 204. The digital outputs of the A/D converters are each received by two high speed microprocessors, the Texas Instruments TMS-320 Digital Signal Processor, perform either a quad cell or lateral effect algorithm in the open loop mode. However, to understand the nature of these algorithms, it is important to understand the nature of the output of the detector, as discussed below.

Both the quad cell detector and the lateral effect detector are commercially-available electro-optical devices which receive a sample of the output beam of a laser telescope. In response to the sampled beam, the detectors each produce electrical signals in output signals with amplitudes that are proportional to the location of the laser beam as it strikes the surface of the detector. These signals are actually output on four electrical terminals, which may be designated as A, B, C and D, and are also separately converted into digital by the A/D units 203 and 204.

If the detector 201 of FIG. 2 was a quad cell detector, then the first microprocessor 205 will output a digital signal indicative of the laser's position on the X axis using the quad cell algorithm as defined below in Equation 1.

$$X = \frac{A - C}{A + B + C + D} \quad (1)$$

Similarly if the detector 201 of FIG. 2 was a quad cell detector, then the second microprocessor 206 will output a digital signal indicative of the laser's position on the Y axis using the quad cell algorithm defined below in Equation 2.

$$Y = \frac{B - D}{A + B + C + D} \quad (2)$$

If the detector 201 of FIG. 2 was a lateral effect detector, then the first microprocessor 205 will output a digital signal indicative of the laser's position on the X axis using the lateral effect algorithm as defined below in Equation 3.

$$X = \frac{A - C}{A + D} \quad (3)$$

Similarly, if the detector 201 of FIG. 2 was a lateral effect detector, then the second microprocessor 206 will output a digital signal indicative of the laser's position on the Y axis using the lateral effect algorithm as defined below in Equation 4.

$$Y = \frac{B - D}{B + D} \quad (4)$$

Once the two microprocessors 205 and 206 have calculated and output digital signals which represent the X and Y position of the laser beams sampled, the two digital-to-analog converters 208 and 209 convert them into analog signals. These analog signals which give the X and Y position are then sent to their electronic equipment that develop a correction signal to an electro-mechanical mirror. An example of this is shown in which the measured X and Y signals are sent to "compensators." These compensators are usually electrical driver mechanisms which adjust the tilt of each telescope output by changes in the optical path length adjusters. An excellent example of such a system is also found in the above-cited Fender et al reference, and it need not be redescribed here.

As depicted in FIG. 2, the two microprocessors 205 and 206 have an optional central processor 207 electrically connected between them. The central processor can receive and monitor all signals that are received and produced by the microprocessors to provide a control of their operation in a number of ways. For example, the central processor 207 monitors the activity of the 320s and, if a problem arises, can stop the 320s from processing until the error condition is resolved. In this way, the experiment is essentially frozen in time. This allows the scientist running the experiment to examine the experiment to try and determine the factors involved in the error condition. This also alleviates possible equipment damage, or cumbersome realignment procedures. Other functions that the central processor can perform includes adjusting or selecting gains of the analog circuitry, adjusting offsets of detectors through a 12 bit D/A, controlling front panel indicators, and communicating with a user through a monitor and keyboard.

The parallel processing architecture of the TMS 320s affords maximum operating bandwidths while minimizing user intervention. The level of control allows "smart" software to make decisions and even corrections if error conditions are detected. The lateral effect algorithm takes approximately 4μsec, the communications of the 320s and the CP central processor takes approximately 3μsec, and the digital filter algorithm takes approximately 3μsec for a total of 10 μsec. The A/D conversion time is 12μsec. Therefore, all functions of the invention can be performed in less time than it takes to convert one sample. The flexibility, versatility, and level of control built into the system lends itself to various other applications as well such as a position monitor for an antenna system that produces a voltage dependent upon azimuth and elevation of the antenna.

The TMS 320 was chosen primarily because of the speed. Typical instructions of the TMS 320 are executed in 200 nanoseconds (nsec). Therefore, with efficient programming, algorithms could be executed very fast thus allowing maximum bandwidths to be achieved. Another important factor in this design is the analog and digital interface. In order to achieve the best resolution it was determined that the analog to digital converter (A/D) should be at least 14 bits. Through much researching, the Analog Devices ADV 1131J A/D was chosen. This device has a 14 bit result and does a conversion in 12 microseconds. Since the TMS 320 is a 16 bit machine it was decided that the Digital to Analog Converter (D/A) should be 16 bits wide as well. The Burr Brown DAC707 was then chosen as the D/A. This device has 16 bits of resolution and performs the D/A function in 3 microseconds. Once the "workhorse" components were chosen, the selection of a CP was next. Rather than designing a dedicated CP unit, the CPU board market was overflowing with choices. An S-100 type board was chosen because of the physical size, and an INTEL 80186 processor was chosen because of its speed and higher level arithmetic and addressing capabilities. The choice of a CP could have just as easily been a Motorola or other processor, but due to availability and cost, the INTEL version was the best choice. The CP is considered an external peripheral and can be chosen according to preference if desired.

The system of FIG. 3 is the optical sampling system which intercepts a sample of a laser telescope for the position detector 201. The system of FIG. 3 uses a sampling mirror 204 which intercepts a portion of the outgoing wavefront, and reflects it back through the beam splitter 205 and fold mirror 106 through the focusing optics 108 onto the position detector 201. In the present application the position detector 201 of FIG. 3 is actually the system of FIG. 2 detector 201 which outputs analog electrical signals indicative of the tilt of the beam with respect to an X and Y plane which is parallel with the surface of the telescope 101. The present invention was developed for use with a pointer/tracker system which controls an entire array of multiple laser telescopes. Such a system is the subject matter of the above-referenced '621' Baciak reference and is fully described therein. A brief summary of this use is discussed below.

A synthetic aperture is formed when separate optical systems are combined to function as a single larger aperture. When an aperture is synthesized, independent optical systems are phased to form a common image field with resolution determined by the maximum dimension of the array and therefore exceeding that produced by any single element. By optically phasing an array of multiple telescopes, a synthetic aperture is formed which can achieve the performance of an equivalent sized, single laser transmitter.

The pointer/tracker of the above-cited Baciak reference receives X and Y tilt signals from an array of multiple telescopes, and calculates therefrom tilt error signals as that each of the telescopes may be dynamically pointed and tracked in the same direction as a single, reference telescope. The servomechanism that actually adjusts the X and Y tilt of each telescope is the Optical Path Difference Adjusters developed by Captain Marker and Rocketdyne at the AFWL.

Figure 4:
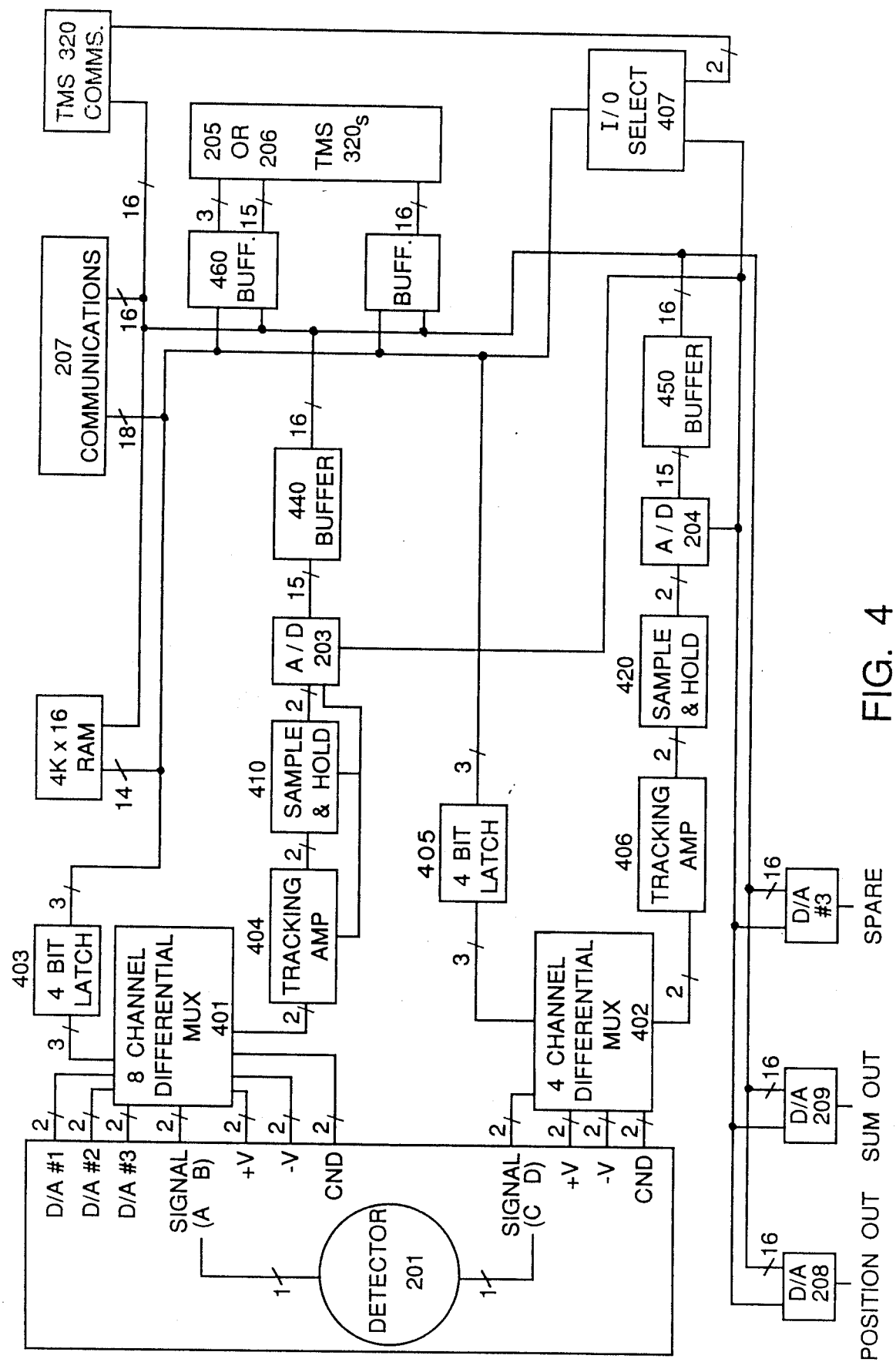
FIG. 4 is a detailed block diagram of the system of FIG. 2.

The reader's attention is now directed towards FIG. 4, which is a detailed block diagram of the system of FIG. 2. The purpose of FIG. 4 is to provide a detailed diagram which describes the analog circuitry that interfaces with the commercially-available quad cell detector 201. As mentioned above, the system was designed for speed, flexibility, and versatility. The basic structure consists of two high speed microprocessors (205 and 206) for algorithm execution and a central microprocessor 207 for calibration of the electronics and to command and control the function of the two high speed microprocessors. As with all microprocessor based systems, flexibility allows as dynamic a system as possible. This configuration allows quad cell or lateral effect algorithms, communications between high speed microprocessors, communication with the central processor, and digital filtering at a 72 KHz sampling rate. This implies that the system can be a high speed digital control system.

The speed at which this system is operating dictates the need to minimize as much logic as possible. The detailed design of this system shows the required TTL logic and circuitry that allows the TMS 320 microprocessors to use the algorithms of Equations 1–4 as described above.

All of the units depicted in FIG. 4 are standard electrical components which are commercially-available, the value of FIG. 4 comes from the detail in which the electrical connections between the individual components are depicted. The detector 201 is as described above, and produces electrical analog output signals (designated A, B, C and D) with currents that are proportional to the location of the sampled laser beam as it strikes the surface of the detector. Note in FIG. 4, the actual terminals which output the signals A–D are depicted. The additional terminals are for the purposes of electrical power and ground connections for calibration functions in the DPM.

The multiplexers 401 and 402, along with the subsequent tracking amplifiers 404, 406, and sample and hold units 410 and 420 receive and conduct the analog detection signals from the detector 201 into the analog-to-digital converters 203 and 204. The digital signals are then conducted by the buffers 440–470 into the microprocessors 205 and 206.

As mentioned above, if the particular detector used is a quad cell detector, the microprocessors calculate the tilt angles X and Y using the quad cell algorithm of equations 1 and 2. If the detector is a lateral effect detector, then the microprocessors 205 and 206 use the lateral effect algorithm of equations 3 and 4.

As mentioned above, an optional portion of the invention is the central processor 207 which controls the function and direction of TMS 320 microprocessors and can serve as a back-up system As depicted in FIG. 4, the central processor 207 also has access to a central data bus downstream from the analog-to-digital converters 203 and 204, which enables it to receive the digitized A–D detection signals. The central processor 207 can be programmed to independently calculate the X and Y tilt signals and can serve as a quality control check of the output signals of the TMS 320's.

The two digital-to-analog converters 208 and 209 receive and convert the digital X and Y tilt angle signals back into their analog equivalents for use by systems as that of the above-cited Baciak reference. As discussed therein, these and other technical developments will advance phased array telescopes into the same common usage that phased array radar systems have experienced over the past ten years. All of the advantages of phased array radar systems (modularity) redundancy, reliability) will enhance optical synthetic apertures which use a phased array of telescopes. As Janet Fender points out in her patent (cited above) phased arrays are modular. They can be built in stages and to some extent be operational. An array of independent telescopes has functional flexibility. Several simultaneous operations can be carried out by individual telescopes within a synthetic aperture. For example, images can be directed to different cameras or spectrographic devices for simultaneous observations in separate imaging modes. When operated as a transmitter, a synthetic aperture has the option of sending beams in different directions.

Phased array apertures have virtually no size limitations. By modularly combining telescopes in a phased configuration, laser transmitters of previously unimaginable sizes can be constructed. Large optics fabrication has historically posed an impermeable barrier to building large aperture telescope systems. By phasing a number of reasonably-sized telescopes, extremely large transmitting apertures can be achieved with present fabrication technology.

The optical phasing of separate transmitted beams, can be achieved by maintaining matched optical paths, when the laser transmitter is a system which provides inputs into multiple telescopes by dividing a single beam. The present invention will allow multiple independent telescopes to have their output beams monitored and controlled by a system such as that of the above-cited Baciak '621' reference.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A digital position monitor which intercepts a sample of a laser beam from a laser telescope and which calculates therefrom a measurement of the laser beam's direction with respect to an X and Y plane, said digital position monitor comprising:

a means for sampling said laser beam from said laser telescope, said sampling means intercepting a portion of said laser beam to produce an optical sample of said laser beam;

a means for detecting the laser beam's direction, said detecting means receiving and detecting said sample of said laser beam and outputting therefrom first, second, third and fourth analog electrical position indicator signals which indicate said laser beam's direction with respect to said X and Y plane;

a means for converting analog signals into digital signals which receives and converts said first, second, third and fourth analog electrical position indicator signals respectively into first, second, third and fourth digital position indicator signals;

a means for calculating said laser beam's direction in said X and Y plane, said calculating means receiving said first, second, third and fourth digital position indicator signals from said converting means, and calculating therefrom a digital X position signal and a digital Y position signal to indicate said laser beam's position in said X and Y plane; and a means for converting digital signals into analog signals which receives and converts said digital X and Y position signals to output thereby analog X and Y position signals indicative of said laser beam's direction with respect to said X and Y plane.

2. A digital position monitor, as defined in claim 1, wherein said sampling means comprises:

a sampling mirror which intercepts a portion of said laser beam from said laser telescope to reflect said portion back, and produce a sample thereby;

a beam splitter which produces an output by receiving and splitting said sample from said sampling mirror;

a fold mirror which produces an output by directing the output of the beam splitter towards said detecting means; and a means for focusing the output of the fold mirror onto the detecting means, said focusing means thereby producing said optical sample for said detecting means.

3. A digital position monitor, as defined in claim 2, wherein said detecting means comprises a quad cell detector, and wherein said calculating means comprises a data processor system which is programmed to calculate said digital X and Y position signals using a quad cell algorithm, said quad cell algorithm comprising equations that include:

$$X = \frac{A - C}{A + B + C + D} ; \text{ and}$$

$$Y = \frac{B - D}{A + B + C + D} \text{ where}$$

X and Y respectively represent said digital X and Y position signals, and

A, B, C, and D respectively represent said first, second, third and fourth digital position indicator signals.

4. A digital position monitor, as defined in claim 2, wherein said detecting means comprises a lateral effect detector, and wherein said calculating means comprises a data processor system which is programmed to calculate said digital X and Y position signals using a lateral effect algorithm, said lateral effect algorithm which comprises equations that include:

$$X = \frac{A - C}{A + D} ; \text{ and}$$

-continued
$$Y = \frac{A - C}{A + D} \text{ where}$$

X and Y respectively represent said digital X and Y position signals, and

A, B, C, and D respectively represent said first, second, third and fourth digital position indicator signals.

5. A digital position monitor which intercepts a sample of a laser beam from a laser telescope and which calculates therefrom a measurement of the laser beam's direction with respect to an X and Y plane, said digital position monitor comprising:

a sampling mirror which intercepts a portion of said laser beam from said laser telescope to reflect said portion back, and produce a sample thereby;

a beam splitter which produces an output by receiving and splitting said sample from said sampling mirror;

a fold mirror which produces an output by reflecting the output of the beam splitter;

a means for focusing the output of the fold mirror, said focusing means thereby producing an optical sample;

a quad cell detector which receives and detects said optical sample from said focusing means and outputs therefrom first, second, third and fourth analog electrical position indicator signals which indicate said laser beam's direction with respect to said X and Y plane;

a first microprocessor which is programmed to calculate a digital X position signal using a first quad cell algorithm, said first quad cell algorithm comprising equations that include:

$$X = \frac{A - C}{A + B + C + D} ;$$

a second microprocessor which is programmed to calculate a digital Y position signal using a second quad cell algorithm, said second quad call algorithm comprising equations that include:

$$Y = \frac{B - D}{A + B + C + D}$$

where

X and Y respectively represent said digital X and Y position signals, and

A, B, C, and D respectively represent said first, second, third and fourth digital position indicator signals; and a means for converting digital signals into analog signals which receives and converts said digital X and Y position signals from said first and second microprocessors to output thereby analog X and Y position signals indicative of said laser beam's direction with respect to said X and Y plane.

6. A digital position monitor which intercepts a sample of a laser beam from a laser telescope and which calculates therefrom a measurement of the laser beam's direction with respect to an X and Y plane, said digital position monitor comprising:

a sampling mirror which intercepts a position of said laser beam from said laser telescope to reflect said portion back, and procedure a sample thereby;

a beam splitter which produces an output by receiving and splitting said sample from said sampling mirror;

a fold mirror which produces an output by reflecting the output of the beam splitter;

a means for focusing the output of the fold mirror, said focusing means thereby producing an optical sample;

a lateral effect detector which receives and detects said optical sample from said focusing means and outputs therefrom first, second, third and fourth analog electrical position indicator signals which indicate said laser beam's direction with respect to said X and Y plane;

a first microprocessor which is programmed to calculate a digital X position signal using a first lateral effect algorithm which includes:

$$X = \frac{A - C}{A + D} ;$$

a second microprocessor which is programmed to calculate a digital Y position signal using a second lateral effect algorithm which includes:

$$Y = \frac{A - C}{A + D}$$

where

X and Y respectively represent said digital X and Y position signals, and

A, B, C, and D respectively represent said first, second, third and fourth digital position indicator signals; and a means for converting digital signals into analog signals which receives and converts said digital X and Y position signals from said first and second microprocessors to output thereby analog X and Y position signals indicative of said laser beam's direction with respect to said X and Y plane.

* * * * *